(12) United States Patent
Roh

(10) Patent No.: US 9,760,929 B2
(45) Date of Patent: Sep. 12, 2017

(54) MANAGING RIGHTS FOR INSTALLED SOFTWARE APPLICATIONS AND ITEMS PURCHASED THEREWITH

(71) Applicant: KT Corporation, Seongnam-si, Gyeonggi-do (KR)

(72) Inventor: Hak-gyun Roh, Cheonan-si (KR)

(73) Assignee: KT CORPORATION, Seongnam-si (KR)

(*) Notice: Subject to any disclaimer, the term of this patent is extended or adjusted under 35 U.S.C. 154(b) by 493 days.

(21) Appl. No.: 14/463,110

(22) Filed: Aug. 19, 2014

(65) Prior Publication Data
US 2015/0058147 A1 Feb. 26, 2015

(30) Foreign Application Priority Data
Aug. 23, 2013 (KR) .................. 10-2013-0100693

(51) Int. Cl.
*G06Q 30/00* (2012.01)
*G06Q 30/06* (2012.01)
*G06Q 30/02* (2012.01)
*G06F 21/10* (2013.01)

(52) U.S. Cl.
CPC ......... *G06Q 30/0619* (2013.01); *G06F 21/10* (2013.01); *G06Q 30/0278* (2013.01); *G06Q 30/0601* (2013.01); *G06Q 2220/12* (2013.01); *G06Q 2220/145* (2013.01)

(58) Field of Classification Search
CPC .......... G06Q 30/06; G06Q 30/0601–30/0643; G06Q 30/08; G06Q 2220/00; G06Q 2220/10; G06Q 2220/12; G06Q 2220/123; G06Q 2220/127; G06Q 2220/14; G06Q 2220/145; G06Q 2220/16; G06Q 2220/165; G06Q 2220/18; G06F 21/00; G06F 21/10; G06F 21/105; G06F 21/12; G06F 21/16; G06F 21/30; G06F 21/305;
(Continued)

(56) References Cited

U.S. PATENT DOCUMENTS 7,640,186 B1 * 12/2009 Fraser .................. G06Q 20/401
705/26.35
8,364,595 B1   1/2013 Ringewald
(Continued)

FOREIGN PATENT DOCUMENTS

KR   10-2008-0040317 A   5/2008
KR   10-2012-0131686 A   12/2012

OTHER PUBLICATIONS www.playerauctions.com (Feb. 18, 2012 to May 9, 2012) [recovered from www.Archive.org].*

*Primary Examiner* — William Allen
(74) *Attorney, Agent, or Firm* — Brundidge & Stanger, P.C.

(57) ABSTRACT

In one example embodiment, a server includes a receiver configured to receive, from a first device, a request to resell an application installed on the first device and an item purchased using the application; a resale manager configured to: issue, to a second device, a resale price of the application and the item, and receive, from the second device, a request to purchase the application and the item; and a rights manager configured to issue, to a user account authenticated on the second device, rights to use the application and the item.

16 Claims, 10 Drawing Sheets

(58) Field of Classification Search
CPC .......... G06F 21/31–21/43; G06F 21/60; G06F 21/602; G06F 21/62; G06F 21/6209
See application file for complete search history.

(56) References Cited

U.S. PATENT DOCUMENTS

| | | | |
|---|---|---|---|
| 2006/0184379 A1* | 8/2006 | Tan ........................ | G06Q 10/10 705/302 |
| 2009/0119188 A1* | 5/2009 | Pagan ................ | G06Q 30/0601 705/26.1 |
| 2012/0303491 A1* | 11/2012 | Hill ........................ | G06Q 30/06 705/27.2 |
| 2013/0054399 A1* | 2/2013 | Ben-Yaacov .......... | G06Q 20/10 705/26.1 |
| 2013/0060616 A1 | 3/2013 | Block et al. | |
| 2013/0144761 A1* | 6/2013 | Unger ................ | G06Q 30/0633 705/26.81 |
| 2014/0087883 A1* | 3/2014 | Lee ........................ | A63F 13/12 463/42 |
| 2014/0188897 A1* | 7/2014 | Baker ................ | G06Q 30/0631 707/748 |
| 2016/0078575 A1* | 3/2016 | Huang ............... | G06Q 30/0635 705/26.81 |

* cited by examiner

MANAGING RIGHTS FOR INSTALLED SOFTWARE APPLICATIONS AND ITEMS PURCHASED THEREWITH

TECHNICAL FIELD

The embodiments described herein pertain generally to transactions of applications and items pertaining to applications.

BACKGROUND

In recent years, based on increasing supply and demand for smart devices such as smart phones, tablet computer, etc, application marketplaces have made available various software applications and, in addition or in the alternative, items that may be purchased using some of those applications.

SUMMARY

In one example embodiment, a server may include a receiver configured to receive, from a first device, a request to resell an application installed on the first device and an item purchased using the application. The server may also include a resale manager configured to: issue, to a second device, a resale price of the application and the item, and receive, from the second device, a request to purchase the application and the item; as well as a rights manager configured to issue, to a user account authenticated on the second device, rights to use the application and the item.

In another example embodiment, a method performed under control of a server may include receiving, from a first device, a request to resell an application installed on the first device and an item purchased using the application; issuing, to a second device, a resale price of the application and the item; receiving, from the second device, a request to purchase the application and the item; and issuing, to a user account authenticated on the second device, rights to use the application and the item.

In yet another example embodiment, a computer-readable storage medium may store thereon computer-executable instructions that, in response to execution, cause a server to perform operations including: receiving, from a first device, a request to resell an application installed on the first device and an item purchased using the application; issuing, to a second device, a resale price of the application and the item; receiving, from the second device, a request to purchase the application and the item; and issuing, to a user account authenticated on the second device, rights to use the application and the item.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent from the following detailed description. The use of the same reference numbers in different figures indicates similar or identical items.

DETAILED DESCRIPTION

Figure 1:
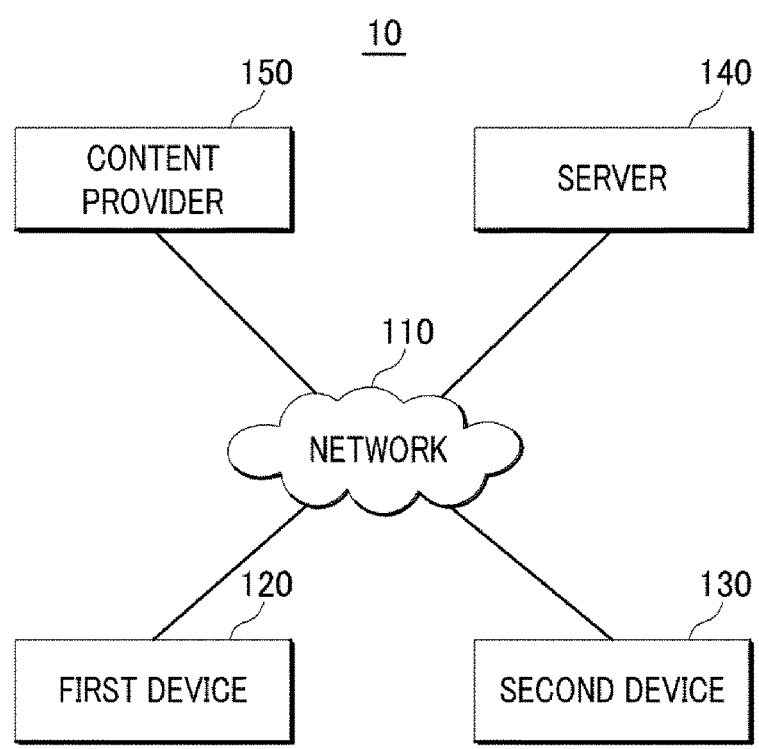
FIG. 1 shows an example system in which a transaction for one or more applications may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which a transaction for one or more applications may be implemented, in accordance with various embodiments described herein. As depicted in FIG. 1, system 10 may include, at least, a first device 120, a second device 130, a server 140 and a content provider 150. At least two or more respective embodiments of first device 120, second device 130, server 140, and content provider 150 may be communicatively connected to each other via a network 110. Unless context requires otherwise, collective reference may be made to first devices 120, second devices 130, servers 140 and/or content provider 150; and representative reference may be made to first device 120, second device 130, server 140 and/or content provider 150.

Network 110 may include, as non-limiting examples, a wireless network such as a mobile radio communication network including at least one of a 3rd generation (3G), $4^{th}$ generation (4G), or $5^{th}$ generation (5G) mobile telecommunications network, various other mobile telecommunications networks, a satellite network, WiBro (Wireless Broadband Internet), Mobile WiMAX, HSDPA (High Speed Downlink Packet Access), Bluetooth, or the like.

Respective ones of first device 120 and second device 130, as non-limiting examples, may refer to a notebook computer, a personal computer, a smart phone, a digital camera, a tablet computer, a phablet device, a smart television, a set-top box and a display coupled thereto, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

Server 140 may refer to one or more apparatuses or servers hosted and/or supported by a service provider that may execute transactions of one or more software applications and/or items, e.g., media content, that may be executed, played, or are otherwise associated with first device 120 and/or second device 120. The transactions may be executed between a user account authenticated on first device 120 and a user account authenticated on second device 130, either directly or through a third party, e.g., an application marketplace. Various actions or operations for the transactions attributed to the user account may be taken by a user via the user account.

Content provider 150 may refer to a server, a device or an apparatus hosted and/or supported by an organization or entity that may generate and/or supply the software applications and/or items that may be subject to the one or more transactions.

In some embodiments, server 140 may be configured to receive, from content provider 150, a request to sell an application and/or an item that may be purchased using the application. As non-limiting examples, the application may refer to a software application executable on first device 120 and second device 130, such as a game application, an application for reproducing and/or playing media content, a social network application, etc. Also as non-limiting examples, the item may include a game item, a game character, graphics, musical content, video content, and/or electronic book (e-book) content.

Further, server 140 may be configured to receive, from content provider 150 along with the request, a resale policy of the application and/or the item. For example, but not as a limitation, the resale policy of the application may include various combinations of an identifier, e.g., serial number, SKU (stock-keeping unit), version, of the application; an original price of the application; a minimum resale price of the application; an allowable number of transactions for the application; an allowable amount of time for transactions for the application; and permissions for resale of the application. Further, the resale policy of the item may include various combinations of an identifier, e.g., serial number, SKU, version of the item; an original price of the item; a minimum resale price of the item; an allowable number of transactions for the item; an allowable amount of time for transactions for the item; or permissions for resale of the item. Further, server 140 may be configured to register and/or store the application and/or the item as a salable target application and item in association with the corresponding resale policy.

In some embodiments, server 140 may be configured to receive, from first device 120, a request to purchase an application. Server 140 may be further configured to issue, to a user account authenticated on first device 120, user rights to the requested application. Server 140 may be still further configured to receive, from first device 120, a request to purchase an item that may be executed on, played on, or otherwise associated with the application. Server 140 may also be configured to issue, to the user account authenticated on first device 120, user rights to the requested item. As referenced herein, user rights to the application or the item may refer to authorization to access, use, play, reproduce, listen, read and/or download the application or the item.

Server 140 may also be configured to transmit, to first device 120, a notification to indicate at least portions of a transaction policy including, but not limited to, one of a minimum resale price of the application and/or item, an allowable number of transactions for the application and/or item or an allowable amount of time for transactions for the application and/or item. Server 140 may be configured to transmit, to first device 120, the notification when server 140 issues the user rights to the application and/or item to the user account authenticated on first device 120.

Server 140 may be configured to receive, from first device 120, a request to resell an application and/or an item purchased using the application for which the user account authenticated on first device 120 has already purchased the user rights. Further, in some embodiments, upon receiving the request to resell the application and/or item, server 140 may be configured to determine whether the application and/or item are eligible for resale with reference to the received resale policy of the application and/or item.

Server 140 may also be configured to determine a resale price of the application and/or item for which the request for resale is received from first device 120. In some embodiments, server 140 may receive, from first device 120, along with the resell request, a user input that indicates a proposed or desired price of the application and/or item. Server 140 may be configured to then determine the proposed or desired price to be the resale price of the application and/or item, based on the received user input. In some other embodiments, server 140 may be configured to produce the resale price of the application and/or item, based on the resale policy of the application and/or item. For example, server 140 may be configured to determine the resale price of the application and/or item, based on at least one of the original price of the application and/or item, the minimum resale price of the application and/or item, a remaining allowable number of transactions for the application and/or item or a remaining allowable amount of time for transactions for the application and/or item. Server 140 may be configured to produce the resale price of the application and/or item in proportion to the original price, minimum resale price, remaining allowable number of transactions and/or remaining allowable amount of time for transactions for the application and/or item. For example, the more allowable number of transactions for the application and/or item remains, server 140 may produce the greater resale price of the application and/or item. In some other embodiments, server 140 may be configured to determine the resale price of the application and/or item, based on at least one of an original price of the application and/or the item or a period for which the application and/or the item were used by first device 120. Server 140 may be configured to determine the resale price of the application and/or item in proportion to the original price of the application and/or item. For example, if an original price of a first application and/or item is higher than an original price of a second application and/or item, a resale price of the first application and/or item will be higher than a resale price for the second application and/or item. On the contrary, server 140 may be configured to determine the resale price of the application and/or item in inverse proportion to the period for which the application and/or the item were used by first device 120. For example, the longer the application and/or item was used by first device 120, the lower the resale price of the application and/or item produced by server 140.

In some embodiments, server 140 may be configured to issue, to second device 130, the resale price of an application and/or item. Server 140 may be configured receive, from second device 130, a request for the resale price of the application and/or item, and to transmit, to second device 130, the resale price of application and/or item in response to the request.

Further, server 140 may be configured to issue, to second device 130, a review of the application and/or item. For example, server 140 may be configured to transmit, to second device 130 along with the resale price, a statistical review for the application and/or item that reflects reputations of other users.

Server 140 may be configured to receive, from second device 130, a request to purchase an application and/or item that were used by first device 120. Further, server 140 may be configured to issue, to the user account authenticated on second device 130, user rights to the application and/or item based on the resale policy of the application and item. For example, server 140 may be configured to issue the user rights to the application and/or item if an allowable number of transactions for the application and/or item remains.

Further, server 140 may be configured to issue, to second device 130, a notification to indicate at least portions of the resale policy of the application and/or item. For example, server 140 may be configured to transmit, to second device 130, the notification to indicate at least one of a minimum resale price of the application and/or item, a remaining allowable number of transactions for the application and/or item or a remaining amount of time for transactions for the application and/or item. In some embodiments, server 140 may be configured to transmit the notification to second device 130 when server 140 issues the user rights to the user account authenticated on second device 130. In some other embodiments, server 140 may be configured to transmit the notification to second device 130, before server 140 issues the user rights to the user account authenticated on second device 130. Thus, a user of second device 140 may make a final decision to purchase the application and/or item in view of the notification to indicate at least one of the minimum resale price of the application and/or item, remaining allowable number of transactions for the application and/or item or remaining amount of time for transactions for the application and/or item.

Further, in some embodiments, server 140 may be configured to revoke, from the user account authenticated on first device 120, the user rights to the application and/or item, when the application and/or item are purchased by the user account authenticated on second device 130. Server 140 may be configured to revoke the user rights from the user account authenticated on first device 120 if the user rights are issued to the user account authenticated on second device 130.

Further, in some embodiments, server 140 may be configured to store, in a memory, a transaction history of each user account authenticated respectively on first device 120 and second device 130. For example, server 140 may be configured to store a transaction history that includes the names of the application and/or item purchased by each user account authenticated respectively on first device 120 and second device 130; and the price of the application and/or item paid by each user account authenticated respectively on first device 120 and second device 130. For example, server 140 may be configured to generate, in the memory, multiple directories, each of which may correspond to respective user accounts authenticated on first device 120 and second device 130. Further, server 140 may be configured to store the transaction history of each user account in the multiple directories.

Server 140 may also be configured to store, in the memory, user rights information corresponding to each user account authenticated respectively on first device 120 and second device 130. The user rights information may include a number of remaining authorized plays or an authorized period for remaining plays for the application and/or item. For example, the memory may include a local memory of server 140 or an external memory or a cloud datacenter communicatively coupled to server 140.

Further, server 140 may be configured to store, in the memory, a resale transaction history that may include a number of past transactions for the application and/or item with regard to at least one of the user account authenticated on first device 120 or the user account authenticated on second device 130. Server 140 may be configured to store a number of resale transactions which were requested and executed by each user account authenticated respectively on first device 120 and second device 130.

Thus, FIG. 1 shows example system 10 in which a transaction for one or more applications may be implemented, in accordance with various embodiments described herein.

Figure 2A:
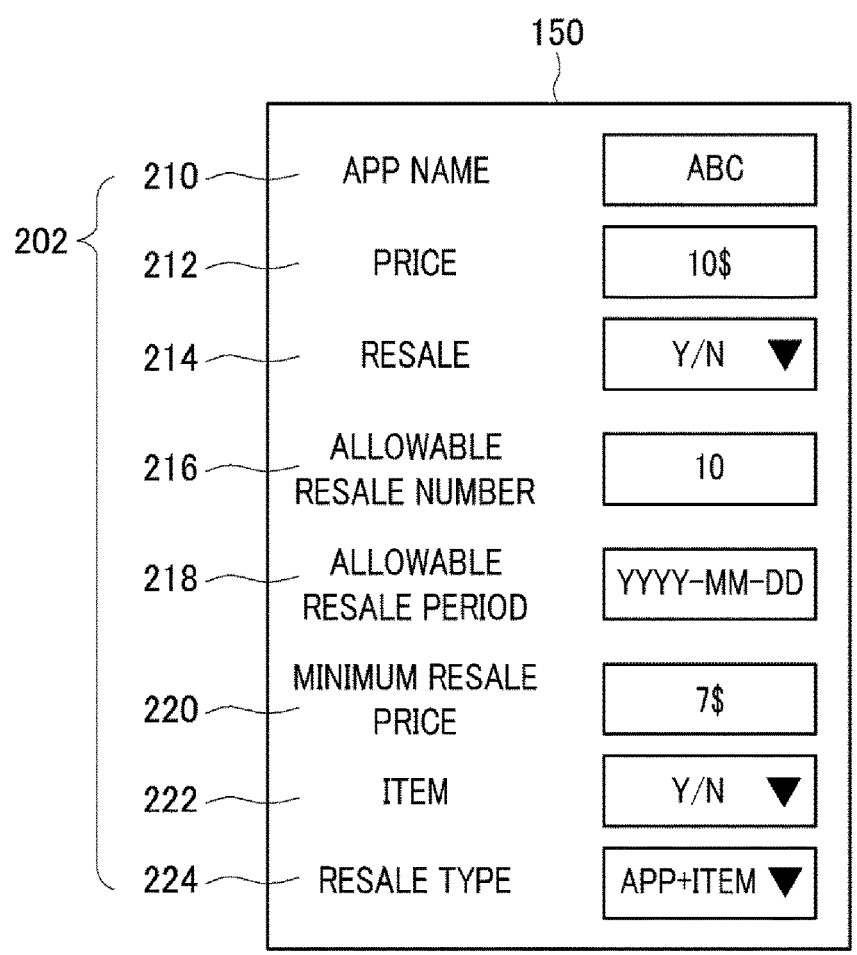
FIG. 2A shows an illustrative example content provider by which at least portions of a transaction for one or more applications may be implemented, in accordance with various embodiments described herein.

FIG. 2A shows an illustrative example content provider by which at least portions of a transaction for one or more applications may be implemented, in accordance with various embodiments described herein. In some embodiments, content provider 150 may be configured to display an interface 202 to be used to establish and transmit a resale policy of an application on a display that may be part of, or communicatively coupled to, content provider 150. For example, but not as a limitation, as depicted in FIG. 2A, interface 202 may include a name 210 of the application, an original price 212 of the application, an input box 214 to receive input to determine whether to allow resale of the application, an allowable resale number 216 of the application (e.g., allowable number of transactions for the application), an allowable resale period 218 of the application (e.g., allowable amount of time for transactions for the application), a minimum resale price 220 of the application, an input box 222 to receive an input to indicate whether an item to be purchased using the application exists, and an input box 224 to receive an input to determine a resale type of the application (e.g., resell the application independently or resell the application along with the item).

Figure 2B:
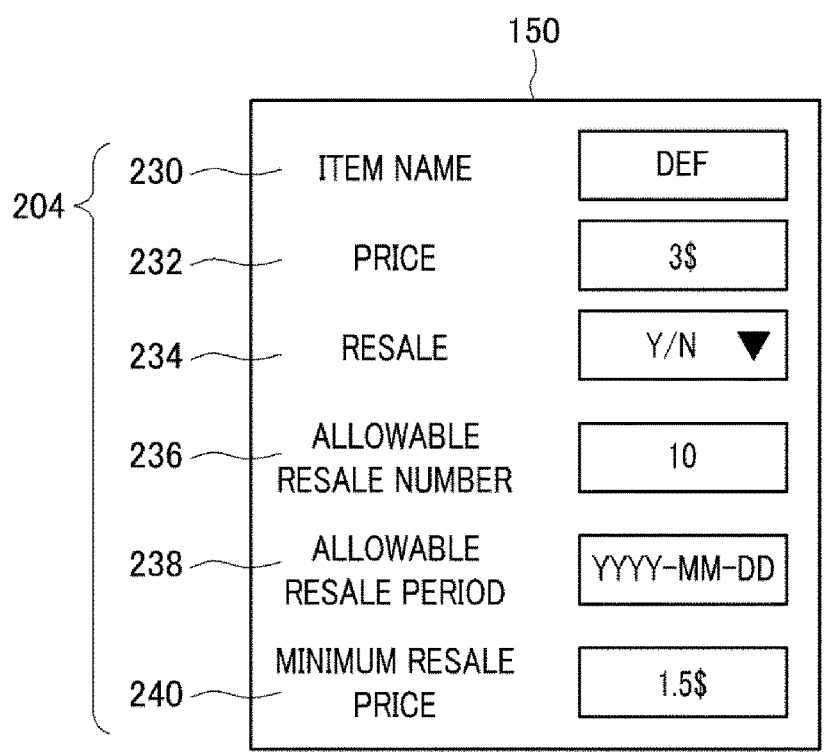
FIG. 2B shows another illustrative example content provider by which at least portions of a transaction for one or more applications may be implemented, in accordance with various embodiments described herein.

FIG. 2B shows another illustrative example content provider by which at least portions of a transaction for one or more applications may be implemented, in accordance with various embodiments described herein. In some embodiments, content provider 150 may be configured to display an interface 204 to be used to establish and transmit a resale policy of an item on a display that may be part of, or communicatively coupled to, content provider 150. For example, but not as a limitation, as depicted in FIG. 2B, interface 204 may include a name 230 of the item, an original price 232 of the item, an input box 234 to receive input to determine whether to allow resale of the item, an allowable resale number 236 of the item (e.g., allowable number of transactions for the item), an allowable resale period 238 of the item (e.g., allowable amount of time for transactions for the item), and a minimum resale price 240 of the item.

Server 140 may be configured to receive, from content provider 150, the resale policy of the application and/or item, and to store the received resale policy of the application and/or item. Further, server 140 may be configured to determine a resale price of the application based on the resale policy of the application, and to determine a resale price of the item based on the resale policy of the item. For example, server 140 may be configured to determine the resale price of the application and/or item in proportion to the original price, minimum resale price, remaining allowable resale numbers and/or remaining allowable resale period for the application and/or item. For example, the greater the original price of the application and/or item is, server 140 may determine the greater resale price of the application and/or item. Further, server 140 may be configured to issue, to a user account authenticated on a device (e.g., second device 130), user rights to the application and/or item, based on the resale policy of the application and item.

Thus, FIG. 2A shows an illustrative example content provider by which at least portions of a transaction for one or more applications may be implemented, in accordance with various embodiments described herein. Further, FIG. 2B shows another illustrative example content provider by which at least portions of a transaction for one or more applications may be implemented, in accordance with various embodiments described herein.

Figure 3A:
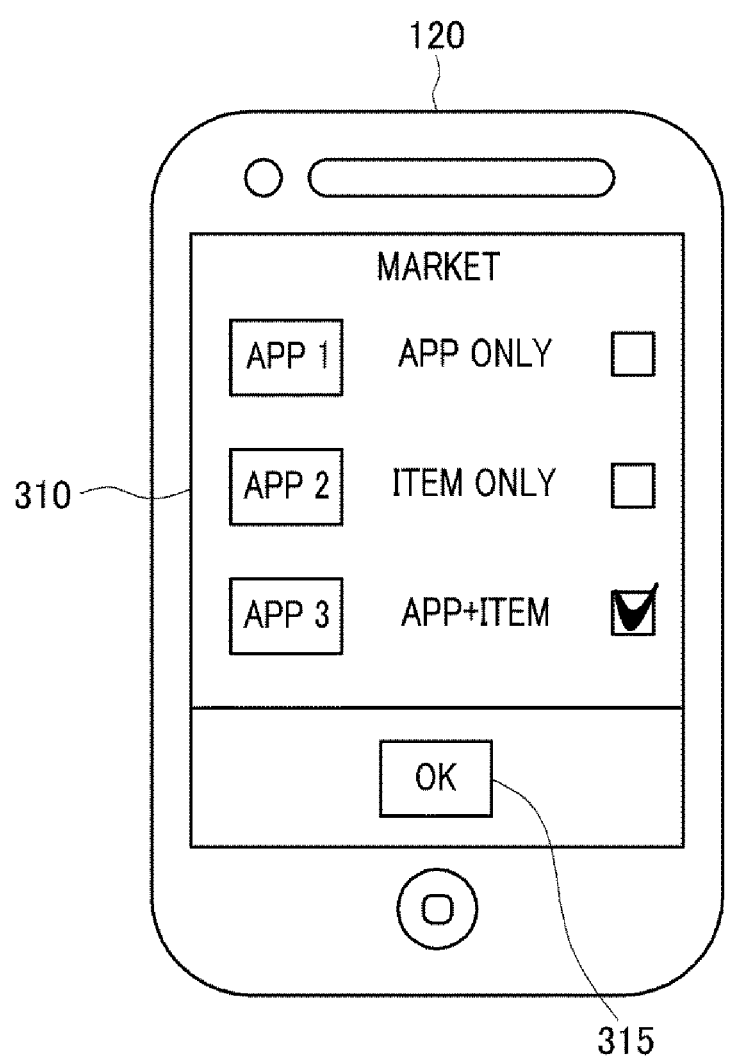
FIG. 3A shows an illustrative example device by which at least portions of a transaction for one or more applications may be implemented, in accordance with various embodiments described herein.

FIG. 3A shows an illustrative example device by which at least portions of a transaction for one or more applications may be implemented, in accordance with various embodiments described herein. In some embodiments, for example, first device 120 may be configured to display an interface 310 to select an application and/or item to be resold on a display that may be part of, or communicatively coupled to, first device 120. A user account authenticated on first device 120 has already purchased user rights to the application and/or item. For example, as depicted in FIG. 3A, first device 120 may be configured to receive, via interface 310, user input to select an application (e.g., "app 3") and item purchased using the application as a resale target application and item. Further, first device 120 may be configured to transmit, to server 140 via interface 310, a request to resell the selected application (e.g., "app 3") and item, if first device 120 receives an input to an icon 315.

Figure 3B:
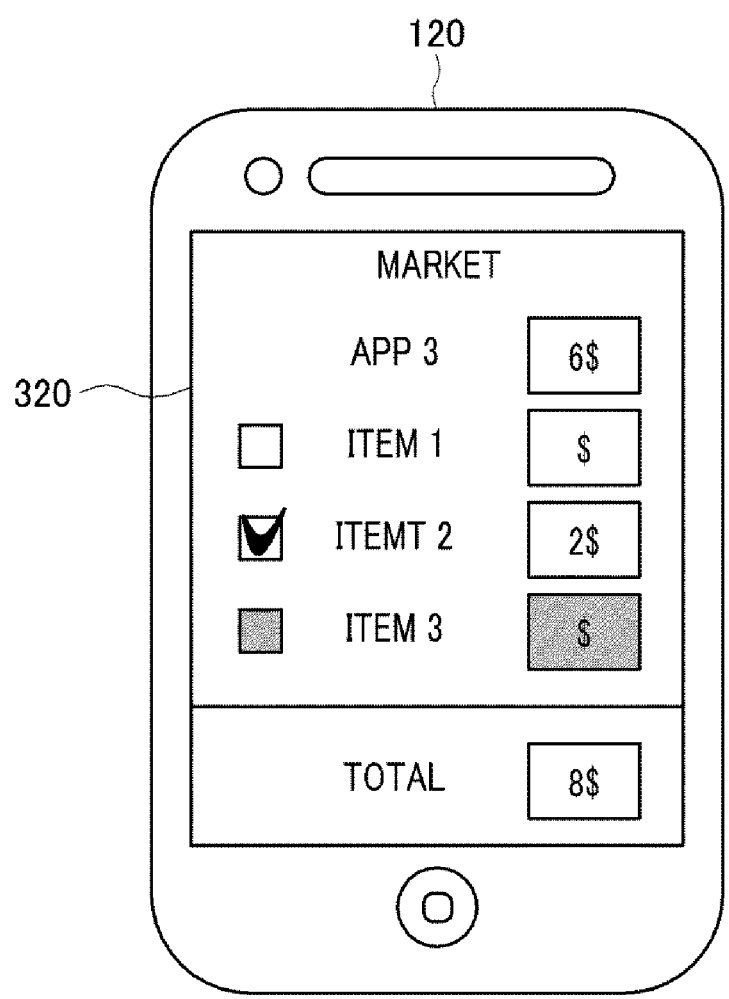
FIG. 3B shows another illustrative example device by which at least portions of a transaction for one or more applications may be implemented, in accordance with various embodiments described herein.

FIG. 3B shows another illustrative example device by which at least portions of a transaction for one or more applications may be implemented, in accordance with various embodiments described herein. In some embodiments, for example, first device 120 may be configured to display an interface 320 to select an item to be resold on a display that may be part of, or communicatively coupled to, first device 120. Further, first device 120 may be configured to receive user input to indicate a proposed or desired resale price of the item and the application associated with the item via interface 320. For example, as depicted in FIG. 3B, first device 120 may be configured to receive user input to indicate a resale price of the application (e.g., 6$). Further, first device 120 may be configured to receive user input to select an item (e.g., "item 2") and user input to indicate a resale price of the item (e.g., 2$). Further, with reference to a resale policy of the item, if an item is not resalable, an input box corresponding to the unresalable item in interface 320 may be deactivated.

Server 140 may be configured to then receive, from first device 120, the request to resell the application and/or the item that were used by first device 120. Further, server 140 may be configured to receive, from first device 120, the user input to indicate the resale price of the application and/or the item.

Thus, FIG. 3A shows an illustrative example device by which at least portions of a transaction for one or more applications may be implemented, in accordance with various embodiments described herein. Further, FIG. 3B shows another illustrative example device by which at least portions of a transaction for one or more applications may be implemented, in accordance with various embodiments described herein.

Figure 4A:
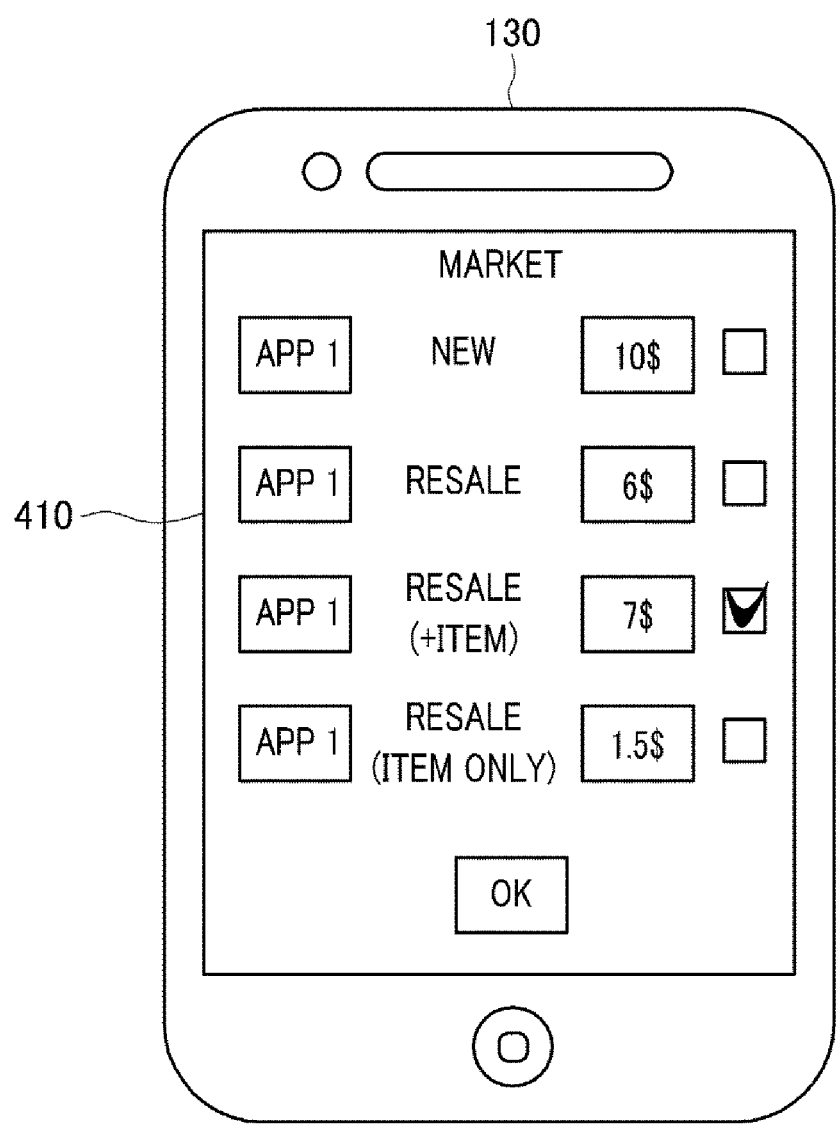
FIG. 4A shows another illustrative example device by which at least portions of a transaction for one or more applications may be implemented, in accordance with various embodiments described herein.

FIG. 4A shows another illustrative example device by which at least portions of a transaction for one or more applications may be implemented, in accordance with various embodiments described herein. In some embodiments, for example, second device 130 may be configured to display an interface 410 to select an application and/or item to be purchased on a display that may be part of, or communicatively coupled to, second device 130. Interface 410 may include a list that shows at least one application and item which are salable, and a price of the at least one application and item. Further, second device 130 may be configured to receive, via interface 410, user input to select an application and/or item from the list.

Figure 4B:
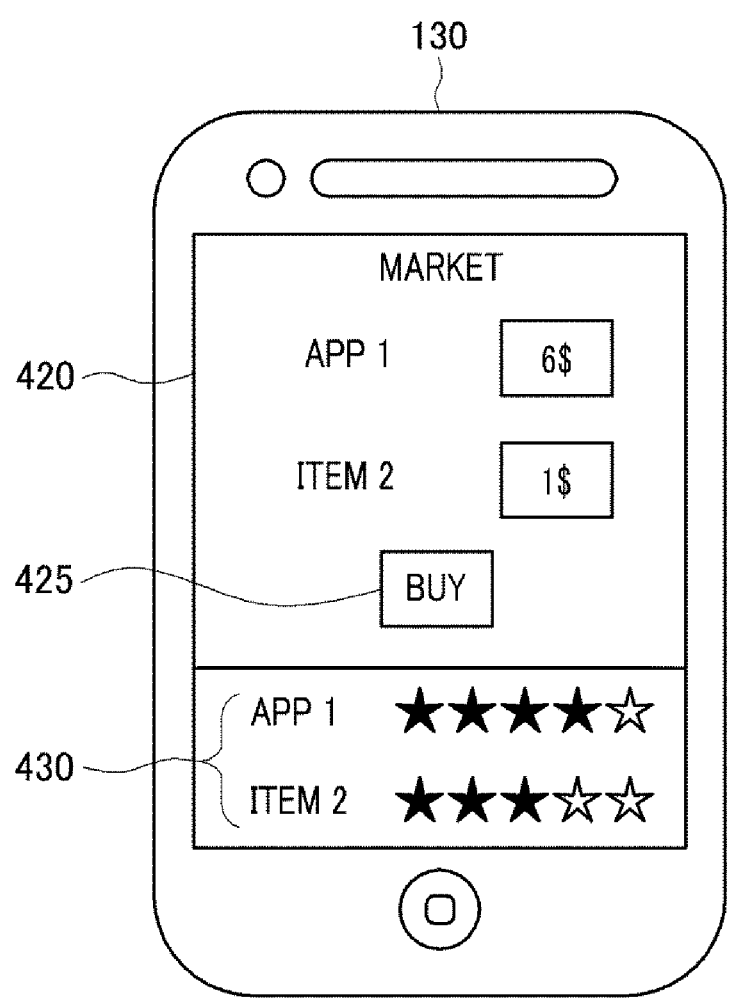
FIG. 4B shows another illustrative example device by which at least portions of a transaction for one or more applications may be implemented, in accordance with various embodiments described herein.

FIG. 4B shows another illustrative example device by which at least portions of a transaction for one or more applications may be implemented, in accordance with various embodiments described herein. In some embodiments, for example, second device 130 may be configured to display an interface 420 to indicate a resale price of a selected application and/or item on a display that may be part of, or communicatively coupled to, second device 130. Further, second device 130 may be configured to receive a request to transmit, to server 140, a request to purchase the selected application and item, if second device 130 receives an input to an icon 425 in interface 420. Further, interface 420 may include a review 430 of the selected application and/or item.

Server 140 may be configured to then receive, from second device 130, the request to purchase the selected application and/or item. Further, server 140 may be configured to issue, to a user account authenticated on second device 130, user rights to the selected application and/or item.

Thus, FIG. 4A shows another illustrative example device by which at least portions of a transaction for one or more applications may be implemented, in accordance with various embodiments described herein. Further, FIG. 4B shows another illustrative example device by which at least portions of a transaction for one or more applications may be implemented, in accordance with various embodiments described herein.

Figure 5:
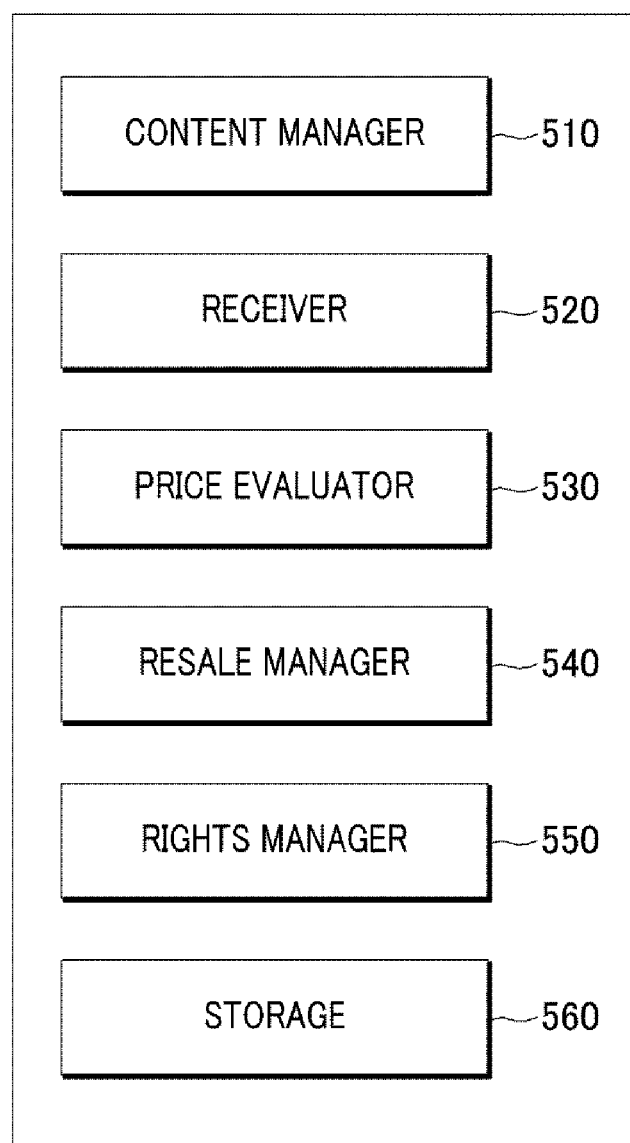
FIG. 5 shows an example server by which at least portions of a transaction for one or more applications may be implemented, in accordance with various embodiments described herein.

FIG. 5 shows an example server by which at least portions of a transaction for one or more applications may be implemented, in accordance with various embodiments described herein. As depicted in FIG. 5, server 140 may include a content manager 510, a receiver 520, a price evaluator 530, a resale manager 540, a rights manager 550 and a storage 560. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of content manager 510, receiver 520, price evaluator 530, resale manager 540, rights manager 550 and storage 560 may be included in an instance of an application hosted on server 140.

Content manager 510 may be configured to receive, from content provider 150, a request to sell an application and/or an item that may be purchased using the application. As non-limiting examples, the application may include a game application, an application for reproducing and/or playing media content or a social network application. Also as non-limiting examples, the item may include a game item, a game character, graphics, musical content, video content, and/or electronic book (e-book) content.

Further, content manager 510 may be configured to receive, from content provider 150 along with the request, a resale policy of the application and/or the item. For example, but not as a limitation, the resale policy of the application may include various combinations of an identifier, e.g., serial number, SKU, version, of the application; an original price of the application; a minimum resale price of the application; an allowable number of transactions for the application; an allowable amount of time for transactions for the application; and permissions for resale the application. Further, the resale policy of the item may include various combinations of an identifier, e.g., serial number, SKU, version of the item; an original price of the item; a minimum resale price of the item; an allowable number of transactions for the item; an allowable amount of time for transactions for the item; or permissions for resale the item. Content manager 510 may be further configured to register and/or store the application and/or the item in association with the corresponding resale policy.

Receiver 520 may be configured to receive, from first device 120, a request to purchase an application. Receiver 520 may be further configured to receive, from first device 120, a request to purchase an item that may be executed on, played on, or otherwise associated with the application.

Receiver 520 may be still further configured to receive, from first device 120, a request to resell an application and/or an item purchased using the application for which a user account authenticated on first device 120 has already purchased the user rights. Further, in some embodiments, receiver 520 may be configured to receive, from first device 120, along with the resell request, user input to indicate a resale price of the application and/or item.

Price evaluator 530 may be configured to determine a resale price of the application and/or item. In some embodiments, price evaluator 530 may be configured determine a received proposed or desired price of the application and/or item to be the resale price of the application and/or item. In some other embodiments, price evaluator 530 may be configured to produce the resale price of the application and/or item, based on the resale policy of the application and/or item. For example, price evaluator 530 may be configured to determine the resale price of the application and/or item, based on at least one of the original price of the application and/or item, the minimum resale price of the application and/or item, a remaining allowable number of transactions for the application and/or item or a remaining allowable amount of time for transactions for the application and/or item. Price evaluator 530 may be configured to produce the resale price of the application and/or item in proportion to the original price, minimum resale price, remaining allowable number of transactions and/or remaining allowable amount of time for transactions for the application and/or item. For example, price evaluator 530 may produce a high resale price of the application and/or item in proportion to a high number of remaining available transactions. In some other embodiments, price evaluator 530 may be configured to determine the resale price of the application and/or item, based on at least one of an original price of the application and/or the item or a period for which the application and/or the item were used by first device 120. Price evaluator 530 may be configured to determine the resale price of the application and/or item in proportion to the original price of the application and/or item. For example, if an original price of a first application and/or item is higher than an original price of a second application and/or item, a resale price of the first application and/or item will be higher than a resale price for the second application and/or item. On the contrary, price evaluator 530 may be configured to determine the resale price of the application and/or item in inverse proportion to the period for which the application and/or the item were used by first device 120. For example, the longer the application and/or item was used by first device 120, the lower the resale price of the application and/or item produced by price evaluator 530.

Resale manager 540 may be configured to issue, to second device 130, the resale price of an application and/or item, which is produced by price evaluator 530. Further, resale manager 540 may be configured to issue, to second device 130, a review of the application and item. For example, resale manager 540 may be configured to transmit, to second device 130, along with the resale price, a statistical review for the application and item that reflects reputations of other users.

Further, resale manager 540 may be configured to receive, from second device 130, a request to purchase an application and/or item that were used by first device 120.

Rights manager 550 may be configured to issue, to a user account authenticated on first device 120, user rights to the application and/or item, in response to the request to purchase the application. As referenced herein, user rights to the application and/or item may refer to authorization to access, use, play, reproduce, listen, read and/or download the application and/or item.

Rights manager 550 may be further configured to transmit, to first device 120, a notification to indicate at least portions of a transaction policy including, but not limited to, one of a minimum resale price of the application and/or item, an allowable number of transactions for the application and/or item or an allowable amount of time for transactions for the application and/or item.

Rights manager 550 may be still further configured to issue, to a user account authenticated on second device 130, user rights to the application and/or item that were used by first device 120, in response to the received request to purchase the application and/or item that were used by first device 120. Rights manager 550 may be configured to issue the user rights to the application and/or item, based on the resale policy of the application and/or item. For example, rights manager 550 may be configured to issue the user rights to the application and/or item if an allowable number of transactions for the application and/or item remains.

Rights manager 550 may be still further configured to issue, to second device 130, a notification to indicate at least portions of the resale policy of the application and/or item. For example, rights manager 550 may be configured to transmit, to second device 130, a notification to indicate at least one of a minimum resale price of the application and/or item, a remaining allowable number of transactions for the application and/or item or a remaining amount of time for transactions for the application and/or item.

Further, rights manager 550 may be configured to revoke, from the user account authenticated on first device 120, the user rights to the application and/or item, when the application and/or item are purchased by the user account authenticated on second device 130. Rights manager 550 may be configured to revoke the user rights from the user account authenticated on first device 120 if the user rights are issued to the user account authenticated on second device 130.

Storage 560 may be configured to store a transaction history of each user account authenticated respectively on first device 120 and second device 130. For example, storage 560 may be configured to store a transaction history that includes the names of the application and/or item; and the price of the application and/or item paid by each user account authenticated respectively on first device 120 and second device 130. Further, storage 560 may be configured to store user rights information corresponding to each user account authenticated respectively on first device 120 and second device 130. The user rights information may include a number of remaining authorized plays or an authorized period for remaining plays for the application and/or item.

Storage 560 may be further configured to store a resale transaction history that may include a number of past transactions for the application and/or item with regard to at least one of the user account authenticated on first device 120 or the user account authenticated on second device 130. Storage 560 may be configured to store a number of resale transactions which were requested and executed by each user account authenticated respectively on first device 120 and second device 130.

Thus, FIG. 5 shows an example server 140 by which at least portions of a transaction for one or more applications may be implemented, in accordance with various embodiments described herein.

Figure 6:
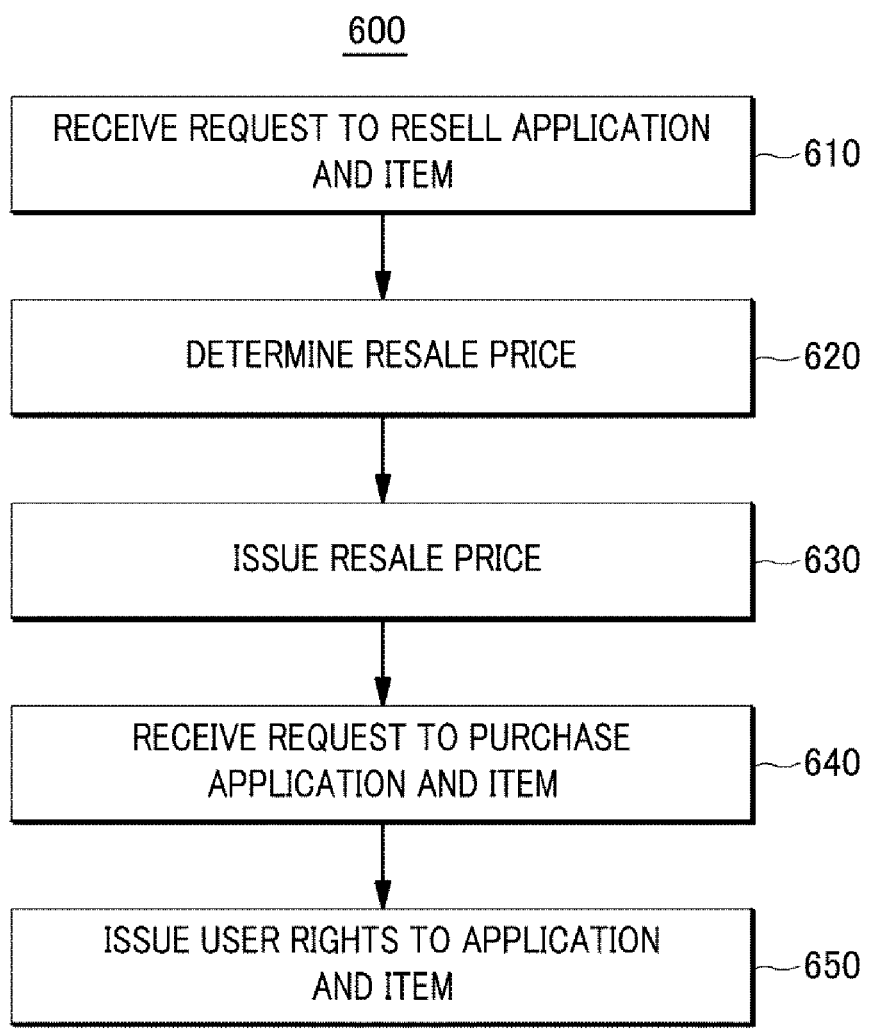
FIG. 6 shows an example processing flow of operations by which at least portions of a transaction for one or more applications may be implemented, in accordance with various embodiments described herein.

FIG. 6 shows an example processing flow 600 of operations by which at least portions of a transaction for one or more applications may be implemented, in accordance with various embodiments described herein. The operations of processing flow 600 may be implemented in system configuration 10 including first device 120, second device 130, server 140 and content provider 150, as illustrated in FIG. 1. Processing flow 600 may include one or more operations, actions, or functions as illustrated by one or more blocks 610, 620, 630, 640 and/or 650. Although illustrated as discrete blocks, various blocks may be divided into additional blocks, combined into fewer blocks, or eliminated, depending on the desired implementation. Processing may begin at block 610.

Block 610 (Receive Request to Resell Application and Item) may refer to server 140 receiving, from first device 120, a request to resell an application installed on first device 120 and an item purchased using the application. The application and item may be a used application and item for which a user account authenticated on first device 120 has already purchased user rights, and the application and item have been used by first device 120. As referenced herein, user rights to the application and item may refer to authorization to access, use, play, reproduce, listen, read and/or download the application and item. In some embodiments, at block 610, server 140 may receive, from first device 120, along with the resell request, user input to indicate a proposed or desired resale price of the application and item. Processing may proceed from block 610 to block 620.

Block 620 (Determine Resale Price) may refer to server 140 determining a resale price of the application and item. In some embodiments, at block 620, server 140 may determine the proposed or desired resale price to be a resale price of the application and item, based on the user input indicating the proposed or desired resale price of the application and item, which is received at block 610. In some other embodiments, server 140 may produce the resale price of the application and item, based on at least one of an original price of the application and item or a period for which the application and the item were used by first device 120. Server 140 may determine the resale price of the application and item in proportion to the original price of the application and item. For example, if an original price of a first application and/or item is higher than an original price of a second application and/or item, a resale price of the first application and/or item will be higher than a resale price for the second application and/or item. On the contrary, server 140 may determine the resale price of the application and item in inverse proportion to the period for which the application and the item were used by first device 120. For example, the longer the application and item were used by first device 120, the lower the resale price of the application and item produced by server 140. Processing may proceed from block 620 to block 630.

Block 630 (Issue Resale Price) may refer to server 140 issuing, to second device 130, the resale price of application and item, which is determined at block 620. Processing may proceed from block 630 to block 640.

Block 640 (Receive Request to Purchase Application and Item) may refer to server 140 receiving, from second device 130, a request to purchase the application and item that were used by first device 120. Processing may proceed from block 640 to block 650.

Block 650 (Issue User Rights to Application and Item) may refer to server 140 issuing, to a user account authenticated on second device 130, user rights to the application and item that were used by first device 120, in response to the request to purchase the application and item, which is received at block 640. In some embodiments, server 140 may issue the user rights to the application and item, based on a resale policy of the application and item. As non-limiting examples, the resale policy of the application may include various combinations of an identifier, e.g., serial number, SKU, version of the application; an original price of the application; a minimum resale price of the application; an allowable number of transactions for the application; an allowable amount of time for transactions for the application; or permissions for resale of the application. Further, the resale policy of the item may include various combinations of an identifier, e.g., serial number, SKU, version of the item; an original price of the item; a minimum resale price of the item; an allowable number of transactions for the item; an allowable amount of time for transactions for the item; or permissions for resale of the item.

Further, in some embodiments, at block 650, server 140 may issue, to second device 130, a notification to indicate at least one of a minimum resale price of the application and item, a remaining allowable number of transactions for the application and item or a remaining amount of time for transactions for the application and item.

Further, at block 650, server 140 may revoke, from the user account authenticated on first device 120, the user rights to the application and item when the user rights are issued to the user account authenticated on second device 130.

Thus, FIG. 6 shows an example processing flow 600 of operations by which at least portions of a transaction for one or more applications may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
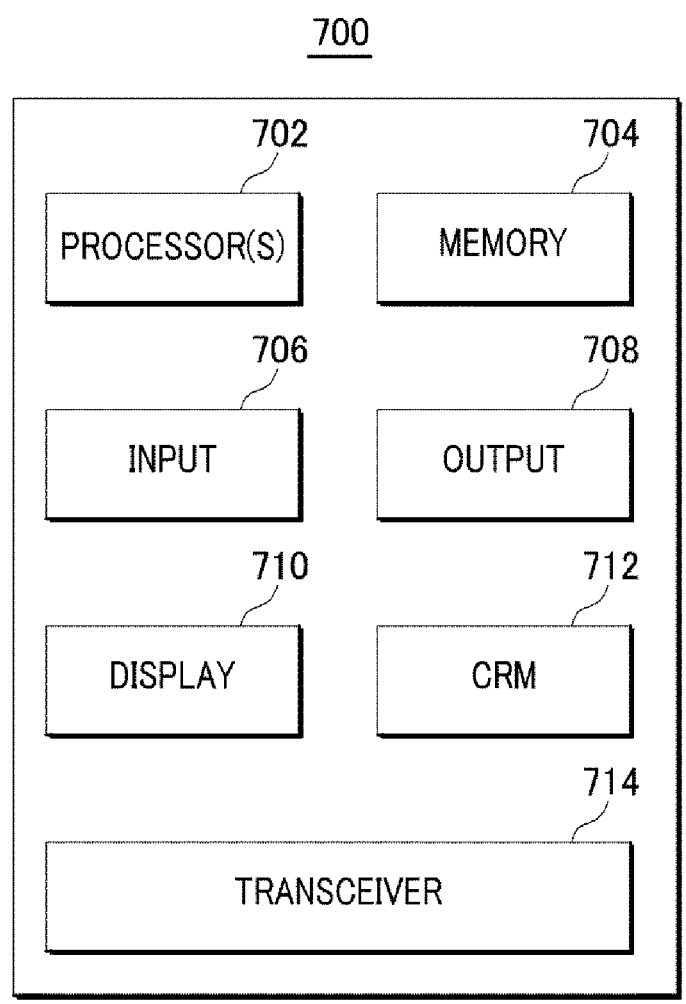
FIG. 7 shows an illustrative computing embodiment, in which any of the processes and sub-processes of a transaction for one or more applications may be implemented as computer-readable instructions stored on a computer-readable medium, in accordance with various embodiments described herein.

FIG. 7 shows an illustrative computing embodiment, in which any of the processes and sub-processes of a transaction for one or more applications may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 700 may typically include, at least, one or more processors 702, a system memory 704, one or more input components 706, one or more output components 708, a display component 710, a computer-readable medium 712, and a transceiver 714.

Processor 702 may refer to, e.g., a microprocessor, a microcontroller, a digital signal processor, or any combination thereof.

Memory 704 may refer to, e.g., a volatile memory, non-volatile memory, or any combination thereof. Memory 704 may store, therein, an operating system, an application, and/or program data. That is, memory 704 may store executable instructions to implement any of the functions or operations described above and, therefore, memory 704 may be regarded as a computer-readable medium.

Input component 706 may refer to a built-in or communicatively coupled keyboard, touch screen, or telecommunication device. Alternatively, input component 706 may include a microphone that is configured, in cooperation with a voice-recognition program that may be stored in memory 704, to receive voice commands from a user of computing device 700. Further, input component 706, if not built-in to computing device 700, may be communicatively coupled thereto via short-range communication protocols including, but not limitation, radio frequency or Bluetooth.

Output component 708 may refer to a component or module, built-in or removable from computing device 700, that is configured to output commands and data to an external device.

Display component 710 may refer to, e.g., a solid state display that may have touch input capabilities. That is, display component 710 may include capabilities that may be shared with or replace those of input component 706.

Computer-readable medium 712 may refer to a separable machine readable medium that is configured to store one or more programs that embody any of the functions or operations described above. That is, computer-readable medium 712, which may be received into or otherwise connected to a drive component of computing device 700, may store executable instructions to implement any of the functions or operations described above. These instructions may be complimentary or otherwise independent of those stored by memory 704.

Transceiver 714 may refer to a network communication link for computing device 700, configured as a wired network or direct-wired connection. Alternatively, transceiver 714 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A server, comprising:
   a processor;
   a receiver configured to receive, from a first device, a request to resell an application installed on the first device and an item purchased using the application;
   a content manager configured to identify a resale policy of the application and a resale policy of the item received from a content provider;
   a resale manager configured to:
      determine whether the application and the item are eligible for resale based on the resale policy of the application and the resale policy of the item,
      responsive to a determination that the application and the item are eligible for resale, issue, to a second device, a resale price of the application and the item, and
      receive, from the second device, a request to purchase the application and the item; and a rights manager configured to:
      revoke rights to use the application and the item from a user account authenticated on the first device to enable a transfer of the rights to use the application and the item from the first device to the second device,
      issue, to a user account authenticated on the second device, rights to use the application and the item based on the resale policy of the application and the resale policy of the item.

2. The server of claim 1, wherein the receiver is further configured to receive, from the first device, a user input indicating the resale price of the application and the item.

3. The server of claim 1, further comprising:
   a price evaluator configured to produce the resale price of the application and the item, based on at least one of an original price of the application and the item or a period for which the application and the item were used by the first device.

4. The server of claim 1, wherein the item includes at least one of a game item, a game character, a graphics, music content, video content or an electronic book (e-book) content.

5. The server of claim 1, wherein the resale manager is further configured to issue a review of the application and the item to the second device.

6. The server of claim 1, wherein the resale policy of the application includes at least one of an original price of the application, a minimum resale price of the application, an allowable number of transactions for the application or an allowable amount of time for transactions for the application, and
wherein the resale policy of the item includes at least one of an original price of the item, a minimum resale price of the item, an allowable number of transactions for the item or an allowable amount of time for transactions for the item.

7. The server of claim 6, wherein the rights manager is further configured to issue, to the second device, a notification to indicate a remaining allowable number of transactions for the application and the item and a remaining amount of time for transactions for the application and the item.

8. The server of claim 1, further comprising:
a storage configured to store a resale transaction history that includes a number of past transactions for the application and the item with regard to at least one of a user account authenticated on the first device or the user account authenticated on the second device.

9. A method performed under control of a server, comprising:
receiving, by the server, from a first device, a request to resell an application installed on the first device and an item purchased using the application;
identifying, by the server, a resale policy of the application and a resale policy of the item received from a content provider;
determining, by the server, whether the application and the item are eligible for resale based on the resale policy of the application and the resale policy of the item;
responsive to determining that the application and the item are eligible for resale, issuing, by the server, to a second device, a resale price of the application and the item;
receiving, by the server, from the second device, a request to purchase the application and the item;
revoking, by the server, rights to use the application and the item from a user account authenticated on the first device to enable a transfer of the rights to use the application and the item from the first device to the second device;
issuing, by the server, to a user account authenticated on the second device, rights to use the application and the item based on the resale policy of the application and the resale policy of the item.

10. The method of claim 9, further comprising:
receiving, from the first device, a user input indicating the resale price of the application and the item.

11. The method of claim 9, further comprising:
producing the resale price of the application and the item, based on at least one of an original price of the application and the item or a period for which the application and the item were used by the first device.

12. The method of claim 9, wherein the item includes at least one of a game item, a game character, graphics, music content, video content or an electronic book (e-book) content.

13. The method of claim 9, wherein the resale policy of the application includes at least one of an original price of the application, a minimum resale price of the application, an allowable number of transactions for the application or an allowable amount of time for transactions for the application, and
wherein the resale policy of the item includes at least one of an original price of the item, a minimum resale price of the item, an allowable number of transactions for the item or an allowable amount of time for transactions for the item.

14. A non-transitory computer-readable storage medium having thereon computer-executable instructions that, in response to execution, cause a server to perform operations, comprising:
receiving, by the server, from a first device, a request to resell an application installed on the first device and an item purchased using the application;
identifying, by the server, a resale policy of the application and a resale policy of the item received from a content provider;
determining, by the server, whether the application and the item are eligible for resale based on the resale policy of the application and the resale policy of the item;
responsive to determining that the application and the item are eligible for resale, issuing, by the server, to a second device, a resale price of the application and the item;
receiving, by the server, from the second device, a request to purchase the application and the item;
revoking, by the server, rights to use the application and the item from a user account authenticated on the first device to enable a transfer of the rights to use the application and the item from the first device to the second device;
issuing, by the server, to a user account authenticated on the second device, rights to use the application and the item.

15. The non-transitory computer-readable storage medium of claim 14, wherein the operations further comprise:
issuing, to the second device, a notification to indicate a remaining allowable number of transactions for the application and the item and a remaining amount of time for transactions for the application and the item.

16. The non-transitory computer-readable storage medium of claim 14, wherein the operations further comprise:
storing a resale transaction history that includes a number of past transactions for the application and the item with regard to at least one of a user account authenticated on the first device or the user account authenticated on the second device.

* * * * *